United States Patent
Sakai et al.

(10) Patent No.: US 8,875,720 B2
(45) Date of Patent: Nov. 4, 2014

(54) APPARATUS AND METHOD FOR WASHING POLYCRYSTALLINE SILICON

(75) Inventors: Kazuhiro Sakai, Yokkaichi (JP); Tetsuya Atsumi, Suzuka (JP); Yukiyasu Miyata, Suzuka (JP)

(73) Assignee: Mitsubishi Materials Corporation, Tokyo (JP)

( * ) Notice: Subject to any disclaimer, the term of this patent is extended or adjusted under 35 U.S.C. 154(b) by 212 days.

(21) Appl. No.: 12/929,585

(22) Filed: Feb. 2, 2011

(65) Prior Publication Data
US 2011/0120506 A1   May 26, 2011

Related U.S. Application Data

(62) Division of application No. 12/591,622, filed on Nov. 25, 2009, now Pat. No. 7,905,963.

(30) Foreign Application Priority Data

Nov. 28, 2008  (JP) .................................. 2008-303822

(51) Int. Cl.
  *B08B 3/04* (2006.01)
  *H01L 21/677* (2006.01)
  *C01B 33/037* (2006.01)

(52) U.S. Cl.
  CPC ................................. *C01B 33/037* (2013.01)
  USPC .................... 134/61; 134/60; 134/82; 134/84

(58) Field of Classification Search
  USPC .......................................................... 134/61
  See application file for complete search history.

(56) References Cited

U.S. PATENT DOCUMENTS

| 2,765,913 A * | 10/1956 | Weiss et al. ................... 210/661 |
| 5,635,053 A | 6/1997 | Aoki et al. |
| 5,824,119 A | 10/1998 | Takeuchi |
| 6,309,467 B1 | 10/2001 | Wochner et al. |
| 6,368,415 B1 | 4/2002 | Asaoka |
| 6,461,444 B1 | 10/2002 | Nishio et al. |
| 7,405,165 B2 | 7/2008 | Fan et al. |
| 2002/0036002 A1 | 3/2002 | Nakatou |

(Continued)

FOREIGN PATENT DOCUMENTS

| DE | 19741465 A1 | 3/1999 |
| JP | 05-004811 A | 1/1993 |

(Continued)

OTHER PUBLICATIONS

European Search Report dated Nov. 3, 2011, issued for the corresponding European patent application No. 09177275.6.

*Primary Examiner* — Joseph L Perrin
*Assistant Examiner* — Levon J Shahinian
(74) *Attorney, Agent, or Firm* — Edwards Wildman Palmer LLP (57) ABSTRACT

Disclosed is a polycrystalline silicon washing apparatus that sequentially immerses polycrystalline silicon into a plurality of acid baths each of which is filled with an acid to wash the polycrystalline silicon. The temperatures of the acids in the acid baths are set such that the temperature of the acid in a later acid bath of adjacent acid baths is equal to or lower than that of a former acid bath and the temperature of the acid in the last acid bath is lower than that of the acid in the first acid bath. Each of the acid baths is provided with a temperature adjusting unit that controls the temperature of the acid at a constant value.

8 Claims, 4 Drawing Sheets

(56) References Cited

U.S. PATENT DOCUMENTS

| | | |
|---|---|---|
| 2002/0168880 A1 | 11/2002 | Hori |
| 2004/0129300 A1 | 7/2004 | Ohshimo et al. |
| 2005/0268939 A1 | 12/2005 | Park |
| 2006/0042539 A1 | 3/2006 | Ohta |
| 2006/0042667 A1* | 3/2006 | Kinomura et al. ............ 134/105 |
| 2006/0096613 A1* | 5/2006 | You et al. ..................... 134/2 |
| 2006/0219274 A1* | 10/2006 | Iwata ............................. 134/61 |
| 2008/0006293 A1 | 1/2008 | Wochner et al. |
| 2009/0060824 A1 | 3/2009 | Sakai |

FOREIGN PATENT DOCUMENTS

| | | |
|---|---|---|
| JP | 07-187900 A | 7/1995 |
| JP | 2000-302594 A | 10/2000 |
| JP | 2002-293688 A | 10/2002 |
| JP | 2007-313454 A | 12/2007 |

* cited by examiner

APPARATUS AND METHOD FOR WASHING POLYCRYSTALLINE SILICON

This application is a divisional application of U.S. application Ser. No. 12/591,622, filed Nov. 25, 2009, and claims the right of priority under 35 U.S.C. §119 based on Japanese Patent Application No. 2008-303822 filed Nov. 28, 2008, which is hereby incorporated by reference herein in its entirety as if fully set forth herein.

BACKGROUND OF THE INVENTION

1. Field of the Invention

The present invention relates to an apparatus and method for washing lump or rod-shaped polycrystalline silicon, which is a raw material of single crystal silicon for semiconductors and silicon for solar cells.

Priority is claimed on Japanese Patent Application No. 2008-303822, filed Nov. 28, 2008, the content of which is incorporated herein by reference.

2. Description of Related Art

In general, single crystal silicon used for semiconductor devices is produced by a Czochralski method. In the Czochralski, method, lump or rod-shaped polycrystalline silicon or single crystal silicon is melted in a quartz crucible, a seed crystal is dipped into the obtained melt, and the seed crystal is pulled to grow a single crystal silicon. In order to obtain high-quality single crystal silicon, it is necessary to minimize the amount of impurities adhered to the surface of the lump or rod-shaped polycrystalline silicon.

In order to minimize the amount of impurities, a method has been used which washes the polycrystalline silicon produced in a predetermined shape with chemicals to remove the impurities adhered to the surface of the polycrystalline silicon.

As the chemicals for removing the impurities, for example, the following have been used: a mixture of hydrofluoric acid, hydrogen peroxide aqueous solution and water (see Japanese Unexamined Patent Application, First Publication No. H5-4811); pure water (see Japanese Unexamined Patent Application, First Publication No. 2002-293688 and Japanese Unexamined Patent Application, First Publication No. 2007-313454); and a mixed solution of a nitric acid and a hydrofluoric acid (see Japanese Unexamined Patent Application, First Publication No 117-187900). The surface of the polycrystalline silicon is washed using these chemicals.

In the method disclosed in Japanese Unexamined Patent Application, First Publication No. H5-4811, since an etching reaction is weaker than that in the method disclosed in Japanese Unexamined Patent Application, First Publication No. H7-187900, impurities are likely to remain on the surface of the polycrystalline silicon. In the methods disclosed in Japanese Unexamined Patent Application, First Publication No. 2002-293688 and Japanese Unexamined Patent Application, First Publication No. 2007-313454, washing is performed with pure water and there is no etching reaction. Therefore, it is difficult to remove the impurities strongly adhered to the surface of the polycrystalline silicon. That is, the quality of the surface of the washed polycrystalline silicon strongly depends on the state (quality) of the surface of the polycrystalline silicon before it is put into a washing apparatus.

In the method disclosed in Japanese Unexamined Patent Application, First Publication No. H7-187900, the surface of the polycrystalline silicon is washed by an etching reaction. The processing stages are continuously performed to prevent the generation of an oxide film which is viewed as spots (hereinafter, referred to as a spot), which causes a deterioration in the quality of the polycrystalline silicon. In addition, an etchant is appropriately supplied to maintain a uniform etching reaction. However, since the polycrystalline silicon and the etchant can be exchanged between the baths, there is a concern that the impurities dissolved in a liquid during etching reaction in the first half of a process will be diffused into the etchant used in the second half of the process. As a result, the impurities are also adhered to the surface of the polycrystalline silicon, which makes it difficult to obtain high-quality polycrystalline silicon.

SUMMARY OF THE INVENTION

The present invention has been made in order to solve the above-mentioned problems, and an object of the present invention is to provide a washing apparatus and a washing method capable of obtaining high-quality polycrystalline silicon having reduced impurities or spots.

According to the present invention, a polycrystalline silicon washing apparatus comprises a plurality of acid baths each of which is filled with an acid and into which polycrystalline silicon is sequentially immersed from a first acid bath to a last acid bath. The temperatures of the acids in the acid baths are set such that the temperature of the acid in a later acid bath of adjacent acid baths is equal to or lower than that of a former acid bath and the temperature of the acid in the last acid bath is lower than that of the acid in the first acid bath.

The former acid bath of adjacent acid baths is the acid bath into which the polycrystalline silicon is immersed earlier. The later acid bath of adjacent acid baths is the acid bath into which the polycrystalline silicon is immersed later.

That is, in order to remove a large amount of impurities from the surface of the polycrystalline silicon, the surface of the polycrystalline silicon may actively react with the acid. However, when the temperature of the acid is increased in order to accelerate the reaction, the surface of the polycrystalline silicon is rapidly oxidized or dissolved by the chemicals used. Therefore, the formation of an oxide film and etching by the dissolution simultaneously occur on the surface of the polycrystalline silicon. As a result, spots are likely to be generated on the surface of the polycrystalline silicon. Therefore, the temperature of the first acid bath is relatively high compared to other acid bathes, the temperatures of the acids in other acid bathes are gradually reduced. The temperature of the acid in the first acid bath is increased for active reaction, thereby removing the impurities adhered to the surface of the polycrystalline silicon. The spots generated on the surface of the polycrystalline silicon by the rapid reaction are gradually removed in the later acid bath whose acid temperature is relatively low. According to the above-mentioned structure, the concentration of impurities in the later acid bath is maintained at a low level. Therefore, high-quality polycrystalline silicon having reduced spots and impurities adhered thereto is brought out from the last acid bath.

In the polycrystalline silicon washing apparatus according to the present invention, each of the acid baths may be provided with a temperature adjusting unit that controls the temperature of the acid in the acid bath at a predetermined range.

When the polycrystalline silicon is immersed into the acid, it reacts with the acid and generate heat. In this case, lumps or short rod-shaped polycrystalline silicon of a predetermined weight are put into the basket and the basket is immersed into the acid. As the dimensions of each lump of the polycrystalline silicon are reduced, the specific surface area thereof is increased and the polycrystalline silicon reacts with the acid more rapidly. Therefore, where there are a large number of small lumps in the basket, a strong reaction occurs and the temperature of the acid increases. In addition, the consumption of the acid is increased. As a result, variations in the etching reaction occur and the quality of the polycrystalline silicon becomes unstable. On the other band, when the dimensions of each lump of the polycrystalline silicon are large, the specific surface area thereof is small. Therefore, an increase in the temperature of the acid is suppressed, and an insufficient etching reaction occurs. As a result, the impurity is likely to be adhered to the surface of the polycrystalline silicon remains. For this reason, the temperature adjusting unit controls the temperature of the acid in each acid bath at a constant value such that a stable reaction occurs.

The polycrystalline silicon washing apparatus according to the present invention may further include, liquid transferring units which are provided between adjacent acid baths among the acid baths and each of which transfers the acid in the later bath of two adjacent acid baths to the former acid bath, an acid supply unit that is provided in at least the last acid bath among the acid baths that are connected to each other by the liquid transferring units, and a liquid discharge system that is connected to the first acid bath.

In two or more adjacent acid baths, the concentration of impurities in the first acid bath is the highest. On the other hand, the concentration of impurities in the last acid bath is the lowest. That is, the concentration of impurities is gradually lowered from the former acid bath to the later acid bath between the first acid bath and the last acid bath. Therefore, the acid including a low concentration of impurities is reused as a washing liquid of the former acid bath including the acid with an impurity concentration higher than that of the later acid bath. As a result, it is possible to use expensive chemicals effectively.

The polycrystalline silicon washing apparatus according to the present invention may further include a pure water bath which is filled with pure water and into which the polycrystalline silicon that has been immersed into the last acid bath and brought out therefrom is immersed.

The polycrystalline silicon washing apparatus according to the present invention may further include at least one intermediate pure water bath which is provided between the first acid bath and the last acid bath and is filled with pure water and into which the polycrystalline silicon is immersed. According to the above-mentioned structure, even when impurities in the acid bath re-adhere to the polycrystalline silicon after the polycrystalline silicon is immersed into the acid bath before the intermediate pure water bath to be washed and is then brought out from the acid bath, it is possible to wash the impurities in the intermediate pure water bath. Therefore, it is possible to prevent the impurities re-adhered to the polycrystalline silicon in the former acid bath from being carried into the later acid bath into which the polycrystalline silicon is immersed after the intermediate pure water bath.

In this case, it is preferable that the intermediate pure water bath be provided after the acid bath in which a large amount of impurities is generated by washing among a plurality of acid baths. In general, the washing efficiency of the first acid bath is the maximum and thus the concentration of impurities in the first acid bath is the highest. Therefore, it is effective to provide the intermediate pure water bath after the first acid bath. However, the intermediate pure water bath may be provided after other acid baths according to the kind or concentration of acids.

According to the present invention, there is provided a method of sequentially immersing polycrystalline silicon into a plurality of acid baths filled with acids to wash the polycrystalline silicon. The present method includes, immersing the polycrystalline silicon into a high-temperature acid bath among the plurality of acid baths to remove impurities from the surface of the polycrystalline silicon, bringing out the polycrystalline silicon from the high-temperature acid bath, and immersing the polycrystalline silicon into an acid bath whose temperature is lower than that of the high-temperature acid bath to remove spots from the surface of the polycrystalline silicon. A plural number of the high-temperature acid bath may be used for the method.

According to the present invention, in the first acid bath, the polycrystalline silicon actively reacts with the acid to remove impurities, and the spots generated in the first acid bath are removed by the later acid bath with a lower temperature. Therefore, it is possible to effectively remove impurities from the surface of the polycrystalline silicon and obtain high-quality polycrystalline silicon having reduced any spots. It is possible to reduce the influence of a variation in the reaction of the polycrystalline silicon immersed into each acid bath and perform a stable reaction by providing a temperature adjusting unit in each acid bath.

In addition, it is possible to reuse the acid used in the later acid bath as a washing liquid of the former acid bath by moving a portion of the acid in the later acid bath to the former acid bath. In this way, it is possible to reduce the amount of acid used. Further, since the above-mentioned processes are continuously performed without being stopped, it is possible to obtain high productivity.

DETAILED DESCRIPTION OF THE INVENTION

Hereinafter a polycrystalline silicon washing apparatus according to an embodiment of the present invention will be described with reference to the accompanying drawings.

Figure 1:
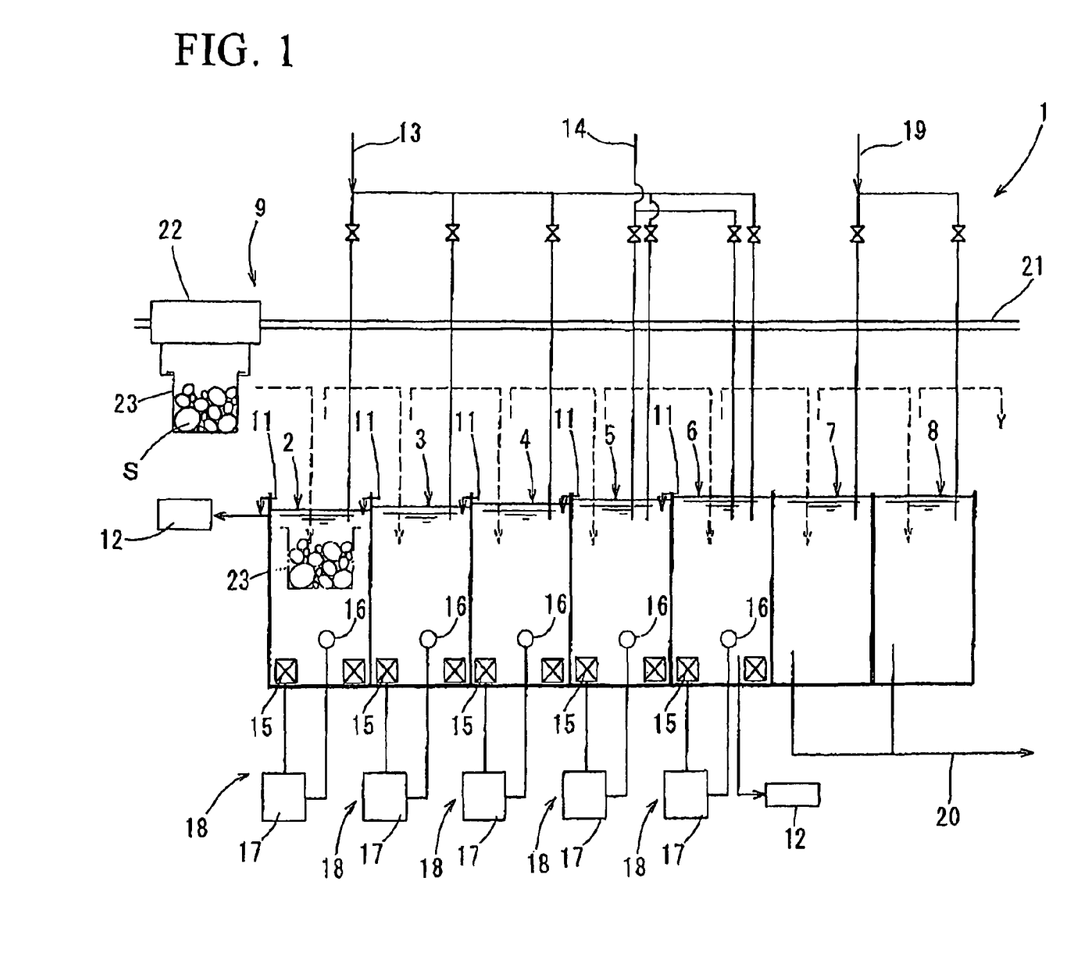
FIG. 1 is a diagram showing the overall structure of a polycrystalline silicon washing apparatus according to a first embodiment of the present invention.
Figure 2:
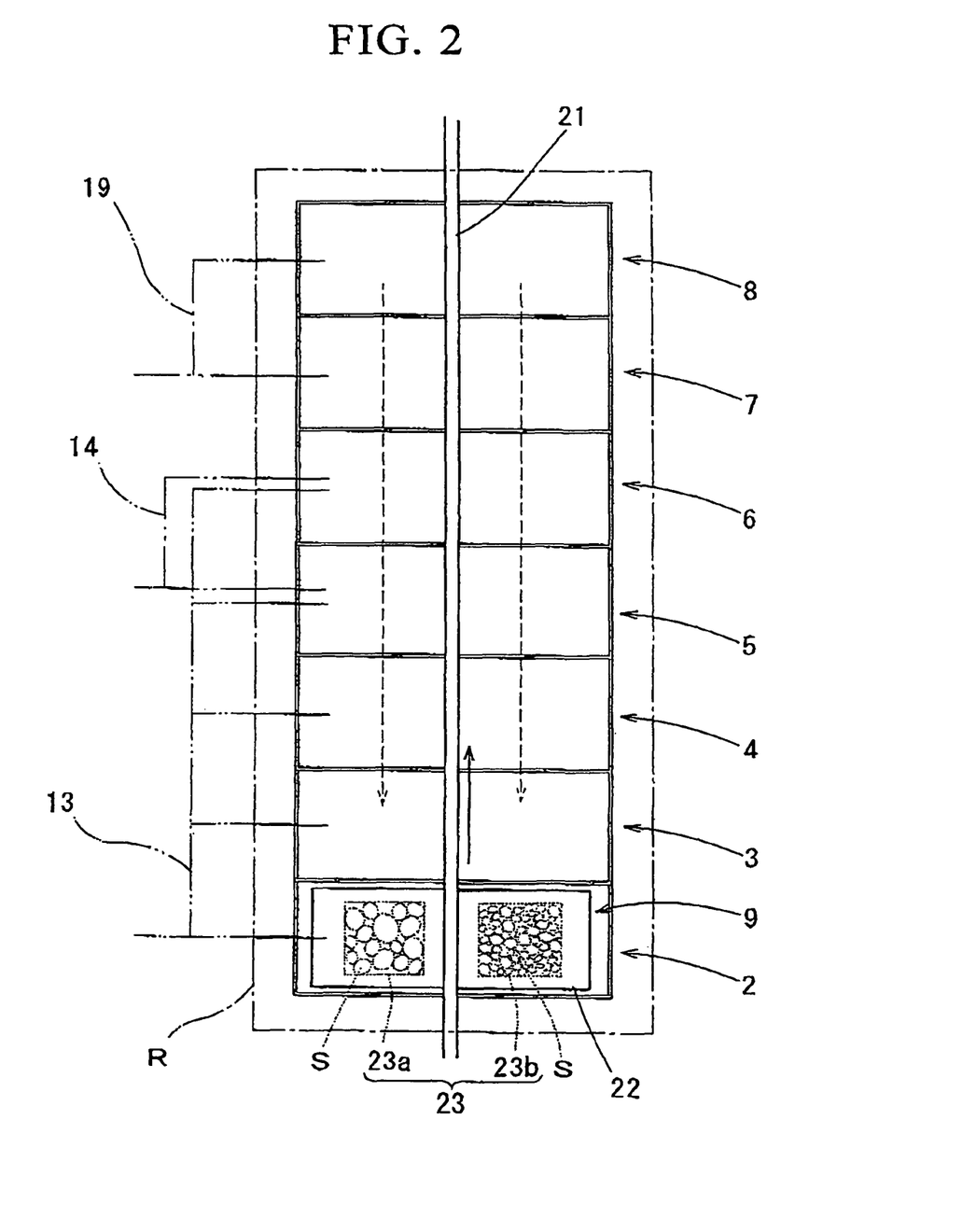
FIG. 2 is a plan view showing baths of the polycrystalline silicon washing apparatus shown in FIG. 1, as viewed from above.

FIGS. 1 and 2 show a first embodiment. A washing apparatus 1 according to the first embodiment includes five acid baths 2 to 6 each filled with an acid and two pure water baths 7 and 8 each filled with pure water, which are arranged in a straight line (hereinafter, the acid baths and the pure water baths are collectively referred to as 'baths'). A transporting unit 9 that sequentially transports a polycrystalline silicon S to the baths 2 to 8 is provided above the baths. The acid baths 2 to 6 are referred to as the first bath 2 to fifth bath 6 in the order in which the polycrystalline silicon is immersed. The size of the each bath is, for example, 600 mm (L)×1200 mm (W)×630 mm (D).

In each of the acid baths 2 to 6, a mixed solution of a hydrofluoric acid and a nitric acid is used as the acid. In this embodiment, the hydrofluoric acid is intermittently supplied to the first bath 2 to fourth bath 5, and the nitric acid is continuously supplied to the fourth bath 5 according to the amount of etching of the immersed polycrystalline silicon.

Examples of the acid used in each of the acid baths include the hydrofluoric acid and/or the nitric acid.

Overflow passages 11 are provided between the acid baths 2 to 6. Among the overflow passages 11, the overflow passage 11 provided in the fifth bath 6 where the polycrystalline silicon is immersed into acid lastly is disposed at the highest position. In addition, the heights of the overflow passages 11 are sequentially lowered from the fifth bath 6 to the former acid bath. That is, the acid sequentially overflows from the fifth bath 6 to the first bath 2. Specifically, the acid in the later acid bath of two adjacent acid baths into which the polycrystalline silicon is immersed later overflows to the former acid bath into which the polycrystalline silicon is immersed previously. The overflow passage 11 forms a liquid transferring unit according to the present invention. A liquid discharge system 12 is connected to the first bath 2 such that the overflowing acid is transported to the liquid discharge system 12. The liquid discharge system 12 is connected to the fifth bath 6.

A hydrofluoric acid supply system 13 is provided to supply the hydrofluoric acid to the acid baths 2 to 6. A nitric acid supply system 14 is provided in the fourth bath 5 and the fifth bath 6.

As described above, the hydrofluoric acid and the nitric acid are supplied to the first bath 2 to fourth bath 5 according to the amount of etching of the polycrystalline silicon. Among the acid baths, in the fifth bath 6 into which the polycrystalline silicon is immersed lastly, the acid is periodically replaced.

Table 1 shows an example of the concentration (wt %) of the nitric acid ($HNO_3$) and the hydrofluoric acid (HF) in each bath. Since the nitric acid and the hydrofluoric acid are mixed with an aqueous solution for use, the remaining component (wt %) is a hydrosilicofluoric acid produced by reaction with water or an acid.

TABLE 1

| Acid bath | $HNO_3$ (wt %) | HF (wt %) |
|---|---|---|
| First bath | 25 to 40 | 1.5 to 3.5 |
| Second bath | 30 to 45 | 1.5 to 3.5 |
| Third bath | 35 to 55 | 1.5 to 3.5 |
| Fourth bath | 45 to 65 | 1.5 to 3.5 |
| Fifth bath | 50 to 65 | 0.1 to 0.5 |

As shown in FIG. 2, each of the acid baths 2 to 6 and the pure water baths 7 and 8 has a rectangular shape that has a long side in a lengthwise direction orthogonal to the direction in which the baths are arranged in a plan view. Each of the supply units of the hydrofluoric acid supply systems 13 and the nitric acid supply system 14 is provided at one end of each of the acid baths 2 to 6 in the lengthwise direction, for example, at the end in the left side of FIG. 2.

A heat exchanger 15 is provided on the bottom of each of the acid baths 2 to 6. The heat exchanger 15 is connected to a heating medium supply system 16. Each of the acid baths 2 to 6 is provided with a liquid temperature measuring unit 17, and a heating medium or a cooling medium is supplied from the heat medium supply system 16 to the heat exchanger 15 on the basis of the measurement result of the liquid temperature measuring unit 17. In this case, the temperature of the acid in each of the acid baths 2 to 6 is set such that, for example, the first bath 2 and the second bath 3 are controlled at a temperature of 40° C., the third bath 4 is controlled at a temperature of 35° C., the fourth bath 5 is controlled at a temperature of 30° C., and the fifth bath 6 is controlled at a temperature of 25° C.

The heat exchanger 15, the liquid temperature measuring unit 17, and the heating medium supply system 16 form a temperature adjusting unit 18 that controls the temperature of the acid in each of the acid baths 2 to 6 at a predetermined set value. The set temperatures and the temperature ranges of the acid baths 2 to 6 (the first bath 2 to the fifth bath 6) are shown in Table 2.

TABLE 2

| Acid bath | Set temperature (° C.) | Temperature range (° C.) |
|---|---|---|
| First bath | 40 | 38 to 41 |
| Second bath | 40 | 38 to 41 |
| Third bath | 35 | 33 to 36 |
| Fourth bath | 30 | 28 to 31 |
| Fifth bath | 25 | 23 to 26 |

The temperatures of the acid baths 2 to 6 may be set such that the temperature of one of adjacent two acid baths into which the polycrystalline silicon is immersed later is 0 to 10° C. lower than that of the other acid bath into which the polycrystalline silicon is immersed former. In addition, the temperature of each of the acid baths 2 to 6 may be controlled in the range of, for example, ±2° C. of the set temperature.

Each of the two pure water baths 7 and 8 arranged after the fifth bath 6 into which the polycrystalline silicon is immersed lastly among the acid baths is filled with room-temperature pure water, and is provided with a pure water supply system 19 and a discharge system 20. The pure water is continuously supplied from the pure water supply system 19 such that the concentration of the acid in the pure water in the pure water baths 7 and 8 does not increase.

For example, the transporting unit 9 is holded such that a rail 21 is provided above the baths 2 to 8 in a direction in which these baths are arranged, a lifting machine 22 that can be moved along the rail 21 is provided, and a basket 23 charged the polycrystalline silicon S can be lifted in the vertical direction by the lifting machine 22. The basket 23 is a box-shaped member with the top open that is made of an acid-resistant plastic material, and a plurality of through holes is formed in the side wall and the bottom plate of the basket. Furthermore, the basket 23 may be closed by the lid (not shown) which a plurality of through holes is formed for preventing polycrystalline silicon S from jumping out of the basket 23 while washing the polycrystalline silicon S. The lifting machine 22 holds the basket 23 and lifts up and down the basket relative to each of the baths 2 to 8 such that the basket is immersed into the liquid in each of the baths for a predetermined amount of time.

In this embodiment, as shown in FIG. 2, two baskets 23 can be lifted down by the lifting machine 22, and the baskets 23 are immersed into each of the baths 2 to 8 while being arranged in a direction orthogonal to the rail 21 (in the lengthwise direction of each bath).

The quantity of the baskets does not limit two, for example, three baskets may be lifted down in the lengthwise direction of each bath.

Figure 4:
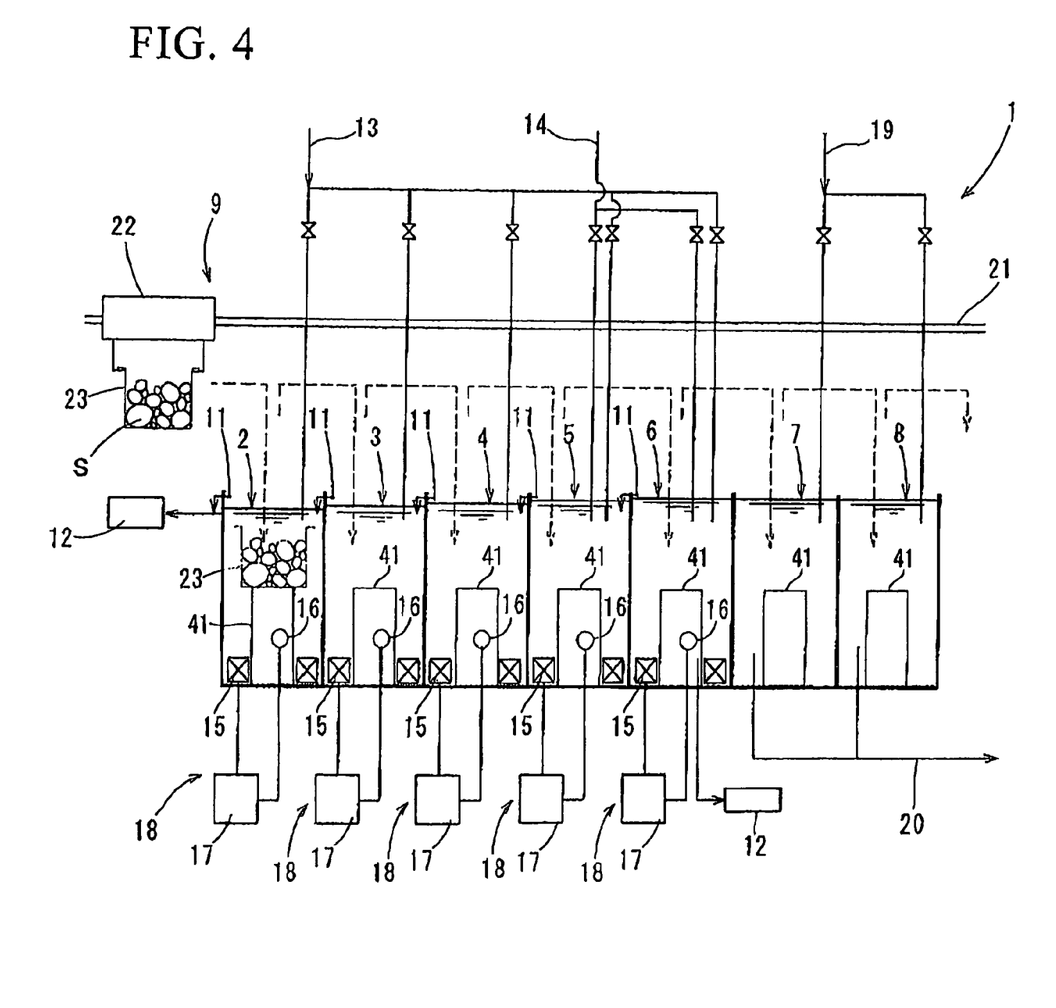
FIG. 4 is a diagram showing the overall structure of a polycrystalline silicon washing apparatus according to the present invention.

As shown in FIG. 4, a holder (or supporting frame) 41 for supporting the basket 23 may be installed on the bottom of each of the baths 2 to 8. The holder 41 has a tray portion (not shown) fitting the baskets 23, and the baskets 23 placed on the holder 41 is fixed by the tray portion. By lifting the baskets 23 down by the lifting machine 22 into the liquid in each of the baths 2 to 8, and the baskets 23 stays on the tray portion of the holder 41 for a predetermined amount of time. Then, the lifting machine 22 gets out the baskets 23, and the baskets 23 is left on the holder 41 in the bath. After the immersion of predetermined period, each basket 23 is lifted up by the lifting machine 22 from the bath. In this case, since the lifting machine 22 can be retracted from the bath during the immersion of the basket 23, it is possible to prevent corrosion of the lifting machine 22.

The acid baths 2 to 6, the pure water baths 7 and 8, and the transporting unit 9 are provided in a clean room R. In the clean room R, the basket 23 is transferred from the first bath 2 to the pure water bath 8, as represented by a solid arrow in FIG. 2, and clean air flows from the pure water bath 8 to the first bath 2, as represented by a dashed arrow. Therefore, the clean air flows in the direction opposite to the transfer direction of the baskets. in the acid baths 2 to 6, NOx is generated during etching, and the NOx accelerates the formation of an oxide film on the surface of the polycrystalline silicon S. When the oxide film is formed, impurities in the atmosphere are likely to be included in the oxide film. Therefore, the clean air flows in order to remove the generated. NOx and the impurities in the atmosphere and prevent the formation of the oxide film on the surface of the polycrystalline silicon S and the contamination of the polycrystalline silicon. Since the clean air flows from the pure water bath 8 to the first bath 2, the polycrystalline silicon is not affected by the NOx with the progress of a washing process.

Next, a method of washing polycrystalline silicon using the polycrystalline silicon washing apparatus 1 having the above-mentioned structure will be described.

In the case of a Siemens method, the polycrystalline silicon is produced in a rod shape. The polycrystalline silicon is cut or broken into short rod-shaped materials, which are called cut rods, or irregular-shaped lumps with an appropriate size. These rod-shaped materials or lumps with a size of predetermined range are put into the basket 23 and the basket is transported by the transporting unit 9.

In this case, the lumps of the polycrystalline silicon S are classified into large, middle, and small lumps according to their sizes. For example, the length of the largest side of the lump is equal to or greater than about 3 mm and equal to or less than about 150 mm. The large size is equal to or more than 90 mm and equal to or less than about 150 mm, the middle size is equal to or more than about 45 mm and equal to or less than about 90 mm, and the small size is equal to or more than about 3 mm and equal to or less than about 45 mm. The lumps classified according to the sizes are charged in the basket 23. When the lumps with different sizes of the polycrystalline silicon S are charged into two baskets 23 (a large size polycrystalline silicon basket 23a and a small size polycrystalline silicon basket 23b) of the transporting unit 9, the large size polycrystalline silicon basket 23a in which the large lumps of the polycrystalline silicon S are charged may be arranged close to the rear side (the left side of FIG. 2, that is, the side where each acid supply system is arranged) of each bath where the supply units of the hydrofluoric acid supply system 13 and the nitric acid supply system 14 are arranged. Since the small lump of the polycrystalline silicon S has a small surface area, the reaction of the small lump with an acid solution is stronger than that of the large lump of the polycrystalline silicon. Therefore, when the small size polycrystalline silicon basket 23b charged small lump of the polycrystalline silicon S may be arranged at a position far from an acid supply position, it is possible to obtain uniform reaction in the two baskets 23. The mesh size of the small size polycrystalline silicon basket 23b may be smaller than that of the large size polycrystalline silicon basket 23a.

As such, the transporting unit 9 holds the two baskets 23a and 23b and immerses the whole basket 23a and the whole basket 23b in the first acid bath 2. When the baskets are immersed, the polycrystalline silicon S is etched on the basis of the following reaction formula (1) and (2).

$$Si + 2HNO_3 \rightarrow SiO_2 + 2HNO_2 \quad (1)$$

$$SiO_2 + 6HF \rightarrow H_2SiF_6 + 2H_2O \quad (2)$$

Since the temperature of the acid in the first bath 2 is set to a relatively high temperature, the amount of etching of the surface of the polycrystalline silicon S is large. In addition, since the acid overflowing from the second bath 3 accounts for most of the acid in the first acid bath and the amount of etching is large, the impurity concentration in the acid is high. For example, the concentration of iron, which is one kind of impurity, is equal to or more than about 90 ng/ml and equal to or less than about 100 ng/ml. Therefore, a large amount of impurities adheres to the surface of the polycrystalline silicon S again. In addition, since an etching reaction is activated by the acid whose temperature is increased, spots (stains) are likely to be generated on the surface of the polycrystalline silicon S. While the polycrystalline silicon is drawn up from the first bath 2 and is then transferred to an adjacent bath, the spots are likely to be generated on the surface of the polycrystalline silicon. The spots have an adverse influence on the quality of the single crystal silicon. In addition, impurities are likely to adhere to the spots.

After immersing the basket 23 into each bath, the transporting unit 9 may alternately perform an operation of moving up and down the basket 23 in the vicinity of the liquid level a plurality of times and an operation of stopping the basket in the bath. The operation of the basket moving up and down enables a fresh acid to be put into the basket 23. As a result, the etching of the polycrystalline silicon S is accelerated. In addition, the positional relationship between the lumps of the polycrystalline silicon S contacted with each other in the basket 23 is changed by vibration during the movement of the basket in the vertical direction and the fluid pressure of the acid solution. As a result, it is possible to accelerate the etching reaction in the contact portion (a portion that is scarcely etched). When the etching reaction occurs rapidly, bubbles are generated, which obstruct uniform etching. However, the movement of the basket in the vertical direction makes it possible to perform uniform etching.

Then, the polycrystalline silicon S is sequentially immersed into the second bath 3 and the third bath 4. The temperature of the second bath 3 is set to 40° C. which is equal to the temperature of the first bath 2, and the temperature of the third bath 4 is also set to a relatively high temperature of 35° C. Therefore, in the second bath 3 and the third bath 4, similar to the first bath 2, the amount of etching is relatively large, and impurity concentration is high. As a result, impurities are likely to adhere to the surface of the polycrystalline silicon again., and spots are likely to be generated.

Since the former baths 2 to 4 into which the polycrystalline silicon has been immersed previously are set to a relatively high temperature and an active etching reaction occurs in the baths, the temperature of the acid in each of the baths tends to further increase. Therefore, the temperature adjusting unit 18 may perform a control operation of circulating a refrigerant through the heat exchanger 15 to control the temperature of the acid at an initial set temperature.

In the washing operation in the first bath 2 to the third bath 4, the main process is to etch the surface of the polycrystalline silicon S with the acid to remove impurities (this process is referred to as an impurity removal process).

Then, the polycrystalline silicon S is immersed into the fourth bath 5. Since the temperature of the acid in the fourth bath 5 (30° C.) is lower than that of the former bath, the amount of etching reaction is small. The etching process in the fourth bath 5 is performed in order to remove the spots generated on the surface of the polycrystalline silicon in the former baths rather than to remove impurities. Then, the polycrystalline silicon S is transported into the fifth bath 6, which is the last acid bath after the fourth bath 5.

Unlike the acid baths 2 to 5, the acid used does not overflow from the outside to the fifth bath 6, but only a new acid is supplied to the fifth bath 6 all the time. In addition, since the amount of etching reaction is small in the fourth bath 5 or former bath, a small amount of impurities is carried from the fourth bath 5 to the fifth bath 6. In addition, since the temperature of the acid in the fifth bath 6 is low (25° C.), the etching reaction is not active. Therefore, the concentration of impurities in the fifth bath 6 is the lowest. For example, the concentration of iron is equal to or more than about 4 ng/ml and equal to or less than about 7 ng/ml, and impurities scarcely adhere again. In addition, some spots generated in the fourth bath 5 or former bath are removed, and the number of spots newly generated in the fifth bath 6 is very small since the temperature of the acid in the fifth bath 6 is low. A discharging pipe for discharging the new acid may be provided in the fifth bath 6.

Therefore, the polycrystalline silicon S drawn up from the fifth bath 6, which is the last acid bath, has high quality with low impurity concentration. In addition, since the etching reaction occurs slowly in the fourth bath 5 and the fifth bath 6, a small amount of heat is generated by the reaction. Since the temperature of the fourth bath 5 and the fifth bath 6 tends to be reduced due to the supply of the acid or the immersing of the polycrystalline silicon, it is preferable to circulate a heating medium through the heat exchanger 15 to control the temperatures of the acids in the baths so as to control an initial set temperature.

In the washing operation in the fourth bath 5 and the fifth bath 6, a main process is to remove the spots generated in the previous impurity removal process (this process is referred to as a spot removal process).

After the basket 23 having the polycrystalline silicon S charged therein is drawn up from the fifth bath 6, the basket 23 is moved up and down above the fifth bath 6 to drop the acid adhered to the surface of the polycrystalline silicon S. Finally, the basket 23 is sequentially immersed into the two pure water baths 7 and 8 to remove the acid which causes the spots. Then, the polycrystalline silicon is dried, packed, and shipped. In the washing operation in the pure water baths 7 and 8, similar to the removing operation in the acid baths 2 to 6, an operation of moving the basket 23 up and down in the vicinity of the liquid level and an operation of stopping the basket in the bath are alternately performed.

As such, the polycrystalline silicon S is gradually etched while sequentially passing through a plurality of acid baths 2 to 6 with a variable set temperature. In this way, it is possible to remove impurities from the surface of the polycrystalline silicon S and prevent the generation of spots during an etching reaction. As a result, it is possible to obtain high-quality polycrystalline silicon.

Table 3 shows the analysis results of the impurities on the surface of the polycrystalline silicon subjected to the above-mentioned washing process by ICP-MS (inductively-coupled plasma mass spectrometry). In addition, the spots were observed by the visual inspection. In Table 3, the unit of numerical values is ng/ml, and a symbol '<' lower limit of determination.

TABLE 3

|  | Fe | Ni | Cr | Cu | Zn | Na | Spots |
|---|---|---|---|---|---|---|---|
| Middle size | <0.05 | <0.01 | <0.01 | <0.01 | <0.02 | <0.02 | None |
| Small size | <0.05 | <0.01 | <0.01 | <0.01 | <0.02 | <0.02 | None |
| Cut rod | <0.05 | <0.01 | <0.01 | <0.01 | <0.02 | <0.02 | None |

As can be seen from Table 3, high-quality polycrystalline silicon having reduced impurities and spots is obtained by the washing processes.

These series of washing processes can be performed by sequentially immersing the polycrystalline silicon into the baths 2 to 8 while transporting it using the transporting unit 9 of the washing apparatus. Therefore, it is possible to process the polycrystalline silicon continuously, which results in high productivity.

Figure 3:
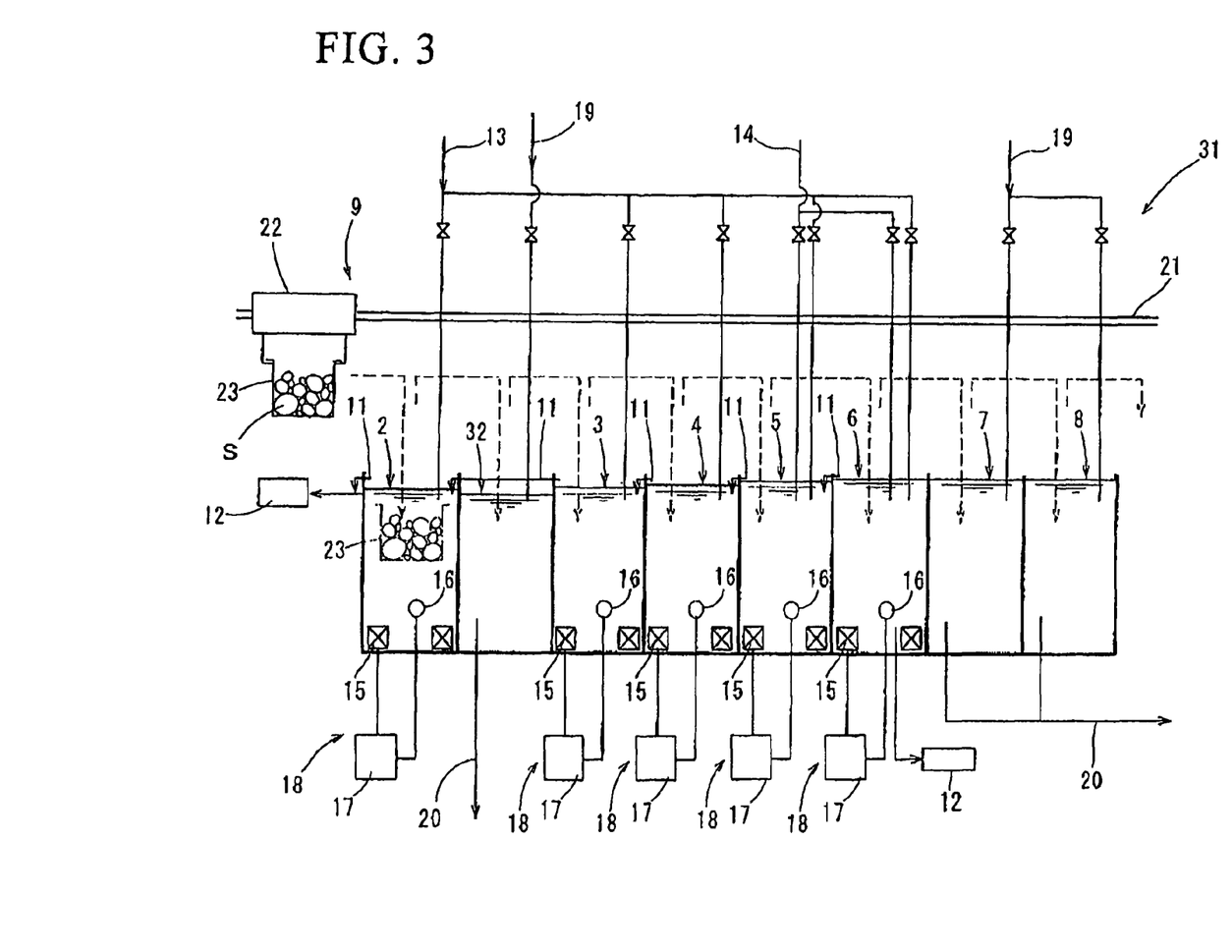
FIG. 3 is a diagram showing the overall structure of a polycrystalline silicon washing apparatus according to a second embodiment of the present invention.

FIG. 3 shows a washing apparatus according to a second embodiment of the present invention. In the second embodiment, the same components as those in the first embodiment are denoted by the same reference numerals and a detailed description thereof will be omitted.

In a polycrystalline silicon washing apparatus 31 according to the second embodiment, similar to the first embodiment, five acid baths, that is, first bath 2 to fifth bath 6 are provided, and two pure water baths 7 and 8 into which polycrystalline silicon is immersed are provided after the fifth bath 6. In the polycrystalline silicon washing apparatus 31, an intermediate pure water bath 32 is provided between the first bath 2 and the second bath 3. The polycrystalline silicon S drawn up from the first bath 2 is immersed into the intermediate pure water bath 32 and is then transported to the second bath 3.

The pure water supply system 19 and the discharge system 20 are connected to the intermediate pure water bath 32, and an overflow passage 11 from the second bath 3 is connected to the first bath 2.

As described above, an etching reaction is most active in the first bath 2. Therefore, in the first bath 2, a large amount of impurities re-adheres to the polycrystalline silicon S. When the impurities re-adhered to the polycrystalline silicon S in the first bath 2 are carried into the second bath 3, the concentration of impurities in the second bath 3 is increased, which hinders the etching reaction in the second bath 3. Therefore, in the washing apparatus 31 according to the second embodiment, the polycrystalline silicon S drawn up from the first bath 2 is immersed into the intermediate pure water bath 32 to wash the impurities re-adhered to the surface thereof, and is then etched in the second bath 3. That is, the polycrystalline silicon S having a surface to which no impurity re-adheres is drawn up from the intermediate pure water bath 32 and the surface of the polycrystalline silicon S is exposed. Therefore, it is possible to effectively remove impurities from the surface of the polycrystalline silicon S by the etching reaction in the second bath 3, which results in an improvement in washing efficiency.

The present invention is not limited to the above-described embodiments, but various modifications and changes of the present invention can be made without departing from the scope and intention of the present invention.

For example, in the above-described embodiments, the overflow passage is provided as a liquid transferring unit that transports the acid used from the later acid bath to the former acid bath. However, instead of the overflow passage, for example, a pump may be used to transport the acid. In addition, in the above-described embodiments, the acid used is sequentially transferred among five acid baths by the overflow passages. However, the acid used may be transferred only among selected two or more acid baths arranged in a line, and the acid used may be discharged from first acid bath and acid baths which is not included in the selected baths by the liquid discharge system. In addition, for example, the number of acid baths or pure water baths and the kind of acid used are just illustrative, but they may be changed according to usage conditions. The number of acid baths may be "n" ("n" is natural numbers).

What is claimed is:

1. A polycrystalline silicon washing apparatus comprising:
a plurality of acid baths each of which is filled with an acid and into which polycrystalline silicon is sequentially immersed,
a transporting unit that sequentially transports the polycrystalline silicon to each of the acid baths,
a device that flows clean air through the polycrystalline silicon washing apparatus in the direction opposite to the transport direction of the polycrystalline silicon by the transporting unit,
a temperature adjusting unit which set such that a temperature of the acid in a later acid bath in which the polycrystalline silicon is immersed later in adjacent acid baths is equal to or lower than that of a former acid bath in which the polycrystalline silicon is immersed earlier and a temperature of the acid in a last acid bath is lower than that of the acid in a first acid bath; and
liquid transferring units which are provided between adjacent acid baths among the acid baths, each of which transfers the acid in the later bath of two adjacent acid baths to the former acid bath, wherein
the liquid transferring units are formed by overflow passages,
the overflow passage provided in the last acid bath where the polycrystalline silicon is immersed into acid lastly is disposed at a highest position,
the heights of the overflow passages are sequentially lowered from the later acid bath to the former acid bath,
the acid in the later acid bath of two adjacent acid baths overflows to the former acid bath,
a hydrofluoric acid supply system provided to supply hydrofluoric acid to the acid baths, and
a nitric acid supply system provided to supply nitric acid to the last acid bath and a second-to-last acid bath.

2. The polycrystalline silicon washing apparatus according to claim 1, wherein each of the acid baths is provided with a temperature adjusting unit that controls the temperature of the acid charged in the acid bath at a predetermined range.

3. The polycrystalline silicon washing apparatus according to claim 1, further comprising:

an acid supply unit that is provided in at least the last acid bath among the acid baths that are connected to each other by the liquid transferring units; and
a liquid discharge system that is connected to the first acid bath.

4. The polycrystalline silicon washing apparatus according to claim 1, further comprising: a pure water bath which is supplied with pure water and into which the polycrystalline silicon that has been immersed into the last acid bath and brought out therefrom is immersed.

5. The polycrystalline silicon washing apparatus according to claim 1, further comprising: at least one intermediate pure water bath which is provided between the first acid bath and the last acid bath and is supplied with pure water and into which the polycrystalline silicon is immersed.

6. The polycrystalline silicon washing apparatus according to claim 1, wherein,
the temperature adjusting unit includes heat exchangers, heating medium supply systems, and liquid temperature measuring units,
the heat exchanger is provided on a bottom of each of the acid baths,
the heat exchanger is connected to the heating medium supply system,
each of the acid baths is provided with the liquid temperature measuring unit, and
heating medium or cooling medium is supplied from the heating medium supply system to the heat exchanger on the basis of the measurement result of the liquid temperature measuring unit.

7. The polycrystalline silicon washing apparatus according to claim 1, wherein the nitric acid supply system is provided to a fourth acid bath and a fifth acid bath.

8. The polycrystalline silicon washing apparatus according to claim 1,
wherein the transporting unit sequentially transports the polycrystalline silicon to each acid bath in a direction in which the acid baths are arranged,
the transporting unit includes baskets which are arranged in a direction orthogonal to the arranged direction of the acids baths,
the baskets include a large size polycrystalline silicon basket and a small size polycrystalline silicon basket,
the large size polycrystalline silicon basket in which large lumps of the polycrystalline silicon are charged is arranged at a position close to the hydrofluoric acid supply system, and
the small size polycrystalline silicon basket in which small lumps of the polycrystalline silicon are charged is arranged at a position far from the hydrofluoric acid supply system.

* * * * *